United States Patent [19]
Blatter

[11] Patent Number: 6,026,094
[45] Date of Patent: Feb. 15, 2000

[54] DIGITAL DATA BUS SYSTEM INCLUDING ARBITRATION

[75] Inventor: Harold Blatter, Indianapolis, Ind.

[73] Assignee: Thomson Consumer Electronics, Inc., Indianapolis, Ind.

[21] Appl. No.: 08/952,358
[22] PCT Filed: Apr. 4, 1996
[86] PCT No.: PCT/US96/04611
§ 371 Date: Nov. 17, 1997
§ 102(e) Date: Nov. 17, 1997
[87] PCT Pub. No.: WO96/37984
PCT Pub. Date: Nov. 28, 1996

[30] Foreign Application Priority Data

May 24, 1995 [GB] United Kingdom .................. 9510509

[51] Int. Cl.[7] ................. H04L 12/413; H04L 12/403
[52] U.S. Cl. ............................. 370/447; 370/451
[58] Field of Search ..................... 370/412, 413, 370/414, 416, 418, 420, 433, 437, 443, 444, 447, 450, 455, 461, 462, 465, 431, 451; 710/116, 119, 121, 123, 266

[56] References Cited

U.S. PATENT DOCUMENTS

| 4,334,288 | 6/1982 | Booher ................................. 710/121 |
| 4,458,314 | 7/1984 | Grimes ................................. 710/123 |
| 4,803,681 | 2/1989 | Takahashi ........................... 370/447 |
| 5,081,578 | 1/1992 | Davis .................................... 710/119 |
| 5,124,983 | 6/1992 | Landez et al. ...................... 370/447 |
| 5,283,904 | 2/1994 | Carson et al. ...................... 710/266 |
| 5,398,243 | 3/1995 | Aguilhon et al. .................. 370/447 |
| 5,418,785 | 5/1995 | Olshanshy et al. ................ 370/452 |
| 5,487,170 | 1/1996 | Bass et al. .......................... 370/461 |
| 5,606,556 | 2/1997 | Kawanishi et al. ................ 370/447 |

FOREIGN PATENT DOCUMENTS

| 91/17615 | of 0000 | WIPO . |
| 94/22247 | of 0000 | WIPO . |

Primary Examiner—Huy D. Vu
Assistant Examiner—Chiho A. Lee
Attorney, Agent, or Firm—Joseph S. Tripoli; Peter M. Emanuel; David T. Shoneman

[57] ABSTRACT

A data bus system is disclosed, including a plurality of nodes coupled together by a daisy chain bus. Each node includes a first and a second bus connection, each having a first and second bidirectional terminal. An arbitration logic is coupled between the first and second bus connection. The node operates in an arbitration mode, during an arbitration time interval, in which the first bidirectional terminal in the first bus connection, and the second bidirectional terminal in the second bus connection are configured to be input terminals, and the second bidirectional terminal in the first bus connection and the first bidirectional terminal in the second bus connection are configured to be output terminals. Then the node operates in a bus access mode in which the first and second bidirectional terminals in the respective first and second bus connections, are both configured to be one of input and output terminals.

9 Claims, 3 Drawing Sheets

DIGITAL DATA BUS SYSTEM INCLUDING ARBITRATION

The present invention relates to a data bus system including an improved arbitration scheme for resolving conflicting transmissions from different nodes on the data bus. In digital data bus systems, such as current daisy chain type bus systems, there are two bidirectional signal paths on each data path. More specifically, each data port or node has a bidirectional data line and some form of bidirectional strobe or clock signal line. In such a system, it is possible for two or more nodes to attempt to use the bus simultaneously. In such a situation, such nodes are said to be in contention. Because only one node may use the bus at a time, when two or more nodes are in contention, a decision must be made of which of the nodes is to be allowed to use the bus, a process known as arbitration. Typically, in these systems, the arbitration for control of the bus is initiated by detecting the conflict of the output drivers of the nodes in contention. If two nodes are in contention, the possible states of the bus are:

| High | if both nodes are driving high |
| --- | --- |
| Low | if both nodes are driving low |
| Middle | if one node is high and the other is low. |

To detect the state of the bus line, three analog level sensors are required. In addition, some form of processing is required after the arbitration is complete to define the direction of the signal transmission for those nodes on the bus between the winning node to the destination node. Multiple level sensors and subsequent processing add cost and complexity to the system.

FIG. 1 is a block diagram illustrating a typical known daisy chain bus system. In FIG. 1, a network of five nodes, A, B, C, D, and E, are connected in a daisy chain bus for interchange of data. Each of the nodes has two connection points, a first connecting to the node on its left (if there is one) and a second connecting to the node on its right (if there is one). In the illustrated embodiment, each connection point contains two signal lines (and possibly more). A first signal line carries bidirectional serial data, and a second signal line carries a bidirectional strobe or clock signal in synchronism with the serial data. The clock signal line is illustrated as the top-most signal line, and the data signal line is illustrated as the bottom-most signal line in FIG. 1. In a daisy chain data bus as illustrated in FIG. 1, the data and clock signal lines are generally bidirectional and the direction of the clock and data signal lines is switched together. That is, the data and strobe lines always transmit data in the same direction.

FIG. 2 is a more detailed block diagram of a prior art node (A; B, C, D or E) in the network illustrated in FIG. 1. In FIG. 2, a left hand connection point 5L includes a clock signal line 7L and a data signal line 9L. The clock signal line 7L and data signal line 9L are coupled to an adjacent node (not shown). The clock signal line 7L and data signal line 9L are coupled to bidirectional terminals of a bidirectional bus driver 10L. A clock output terminal and a data signal output terminal from the bidirectional bus driver 10L are coupled to corresponding input terminals of a receiver 20L. A bidirectional data terminal of the receiver 20L is coupled to a corresponding data terminal of a memory 30 via a data bus 25. The bidirectional data terminal of the memory 30 is also coupled to an input terminal of a transmitter 50L via the data bus 25. A clock output terminal of the transmitter 50L is coupled to a corresponding clock input terminal of the bidirectional bus driver 10L, and a data output terminal of the transmitter 50L is coupled to a corresponding data input terminal of the bidirectional bus driver 10L. A right hand connection point 5R is similarly coupled to the memory 30 via bidirectional bus driver 10R, receiver 20R and tranmitter 50R, and the data bus 25. A control logic circuit 90 provides a control signal for the left and right bidirectional bus drivers 10L and 10R, respectively.

The memory 30 is also coupled to node equipment 40. This node equipment 40 could, for example, be a piece of consumer electronics equipment, such as a television receiver, VCR, CD player, etc. Although the node equipment 40 is illustrated in FIG. 2 as being coupled to the memory 30 via a second bidirectional signal line, it is also possible that the memory 30 is coupled to the node equipment 40, and the transmitters (50L and 50R) and the receivers (20L and 20R) via the data bus 25 in a known manner.

The operation of the network of FIG. 1 will be explained with reference to FIG. 2. In FIG. 1 node B desires to transmit data to node D. After the previous message placed on the daisy chain bus has completed transmission, the output drivers of node B begin to drive the daisy chain bus. If an output driver of one or more other nodes simultaneously begin to drive the daisy chain bus, then an arbitration must be performed, in a known manner, to determine which node is to be given use of the daisy chain bus. It is assumed here that node B is the winner of the arbitration. After the arbitration, further processing is performed, also in a known manner, to determine the direction of transmission of the data from node B, through node C, to node D.

At this point, the control logic 90 provides a control signal to the right hand connection point of node B which configures the right hand bidirectional bus driver 10R into an output mode, i.e., it is transmitting. The memory 30 supplies data from the node equipment 40 to the transmitter 50R, which serializes the data in a known manner and produces a serial data signal and clock signal, which is supplied to the bidirectional bus driver 10R. The bidirectional bus driver 10R, then supplies these signals to the daisy chain bus of FIG. 1.

Node C is not the recipient for the data produced by node B, and passes the data from it's left hand connection to it's right hand connection unchanged. The left hand connection of node C is configured to receive data from the daisy chain bus. The control logic 90 of node C provides a control signal to the left hand connection of node C which configures the left hand bidirectional bus driver 10L into an input mode, i.e., the bidirectional bus driver 10L of node C is configured to receive data from the daisy chain bus. The data and clock signals received from the daisy chain bus are supplied to the receiver 20L, which decodes the serial data and places that data on the data bus 25. At the same time, the control logic 90 provides a control signal to the right hand connection which configures the right hand bidirectional bus driver 10R into the output mode, i.e., the right hand connection of node C transmits data. The transmitter 50R is configured to serialize the data placed on the data bus 25 by the receiver 20L and generate a corresponding clock signal, and the bidirectional bus driver 10R places the data and clock signals on the daisy chain bus.

Node D is the recipient for the data produced by node B. The left hand connection of node D is configured to receive data from the daisy chain bus. The control logic 90 of node D provides a control signal to the left hand connection which configures the left hand bidirectional bus driver 10L into the input mode, and the bidirectional bus driver 10L of node D receives data from the daisy chain bus. The data and clock signals received from the daisy chain bus are supplied to the receiver 20L, which decodes the serial data and places that data on the data bus 25. The memory 30 stores the data received from the daisy chain bus, and the node equipment 40 accesses and further utilizes this stored data.

This arrangement requires the relatively complicated multi-level sensor conflict detection circuitry described above, and further circuitry to determine data transmission direction, after the arbitration, if any, is complete. A data bus system is desirable, however, which does not require the multiple level sensors to detect a conflict, nor the subsequent processing to determine the required direction for the data ports in each node.

The present invention resides, in part, in recognizing the described problems and, in part, in providing a data bus system that addresses the problems. In accordance with principles of the present invention, a data bus system includes a plurality of nodes coupled together by a daisy chain bus. Each node includes a first and a second bus connection, each having a first and second bidirectional terminal. An arbitration logic is coupled between the first and second bus connection. The node operates in an arbitration mode, during an arbitration time interval, in which the first bidirectional terminal in the first bus connection, and the second bidirectional terminal in the second bus connection are configured to be input terminals, and the second bidirectional terminal in the first bus connection and the first bidirectional terminal in the second bus connection are configured to be output terminals. Then the node operates in a bus access mode in which the first and second bidirectional terminals in the respective first and second bus connections, are both configured to be one of input and output terminals.

In accordance with another aspect of the invention, such a system used the following method to arbitrate among the nodes for access to the daisy chain bus. Each node is preassigned a priority number having a predetermined number of bits. First, the node is placed in an active state. Then, a number of time steps equal in number to the predetermined number of bits in the priority number is performed during an arbitration time interval. For each time step one bit of the priority number is selected. If the selected bit has a superior state, then superior state signals are produced at the output terminals of the first and second bus connections. If the selected bit has an inferior state, and the signals at the input terminals of both the first and second bus connections have inferior states, then inferior state signals are produced at the output terminals of the first and second bus connections Otherwise, the node is placed in a passive state for the remainder of the arbitration time interval, in which signals from the input terminal of the first bus connection are supplied unchanged to the output terminal of the second bus connection, and signals from the input terminal of the second bus connection are supplied to the output terminal of the first bus connection. When the arbitration time interval is over, if the node is in the active state, that node accesses the daisy chain bus.

The invention may be better understood by referring to the enclosed drawing in which.

Figure 1:
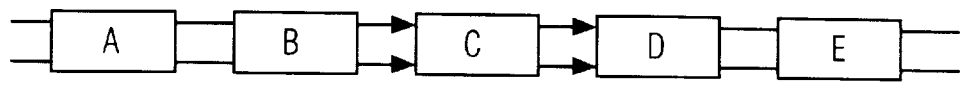
FIG. 1 is a block diagram illustrating a network of nodes arranged on a prior art daisy chain bus.
Figure 2:
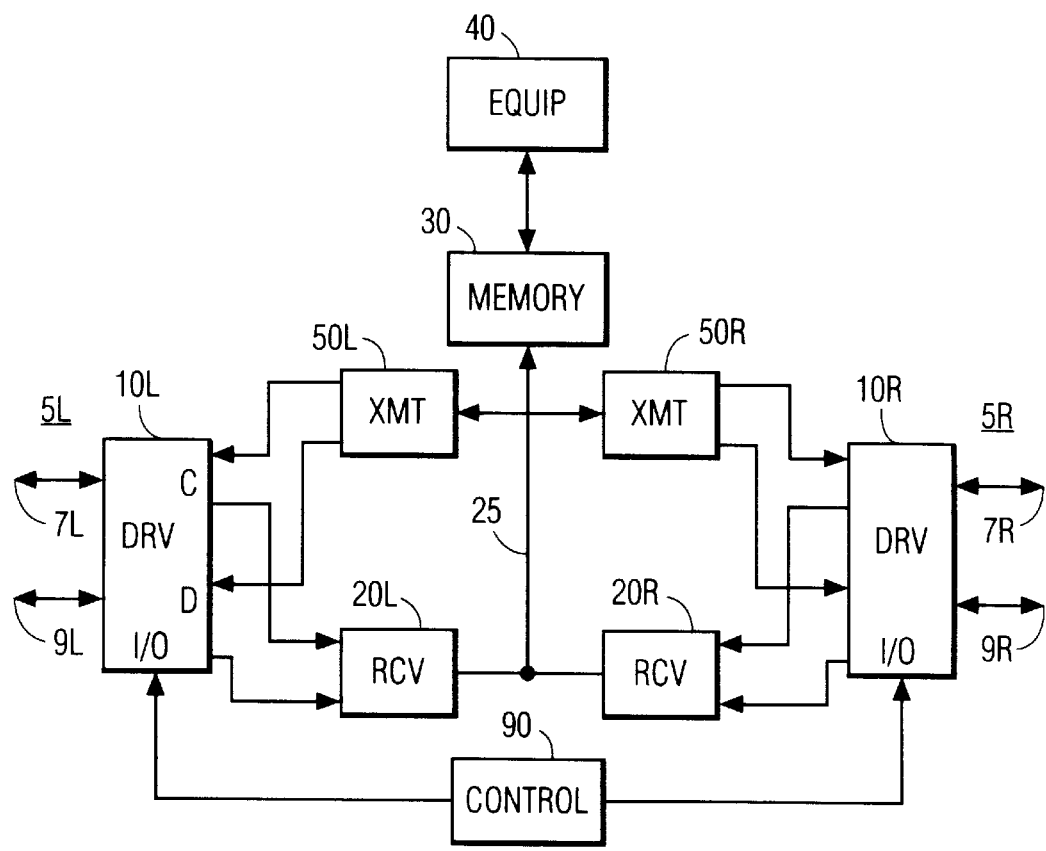
FIG. 2 is a more detailed block diagram of a node illustrated in the network of nodes of FIG. 1.
Figure 3:
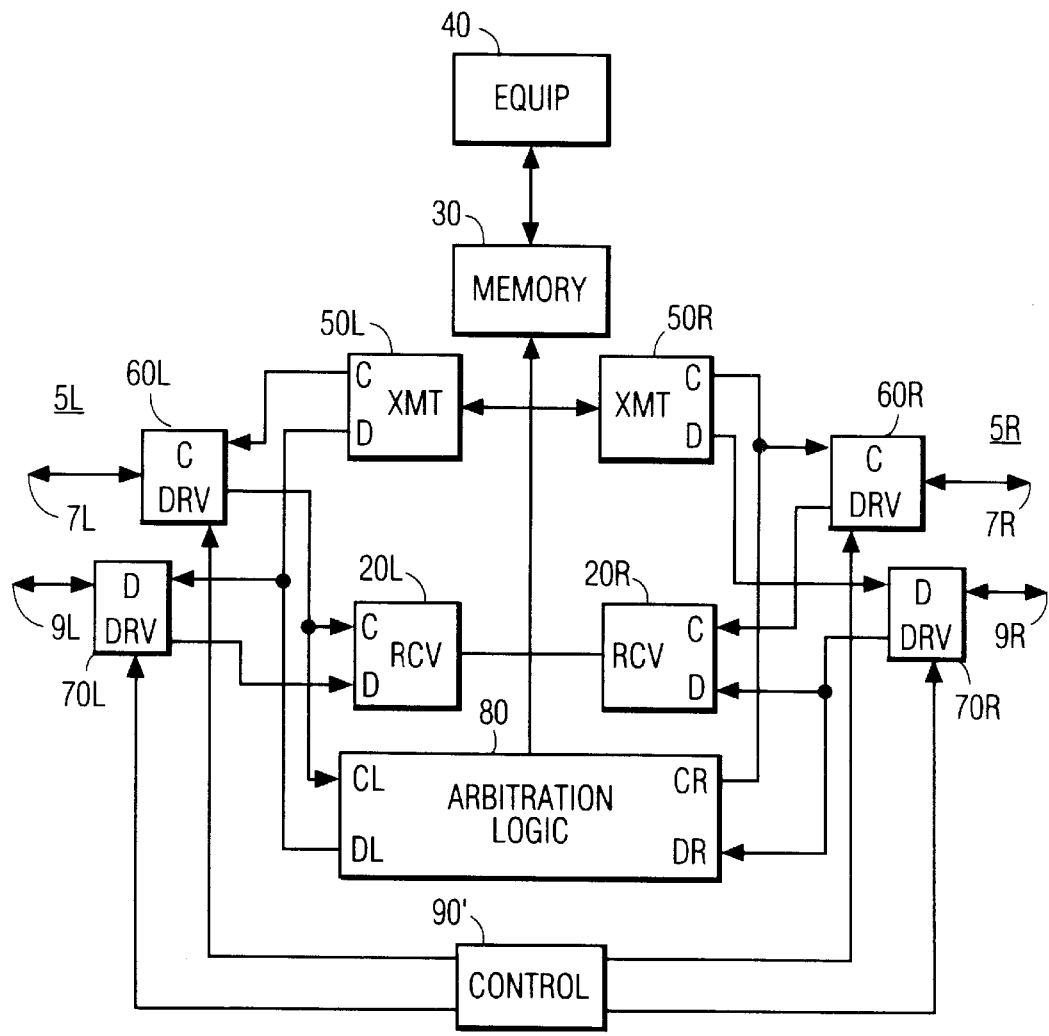
FIG. 3 is a more detailed block diagram of a node, which may be arranged in a network of nodes, according to the present invention.

FIG. 3 is a more detailed block diagram of a node according to the present invention, which may be arranged in a network of nodes in a similar manner to that illustrated in FIG. 1. Elements sinmilar to those illustrated in FIG. 2 are designated by the same reference numbers, and will not be described in detail below. In FIG. 3, the bidirectional bus drivers 10L and 10R of FIG. 2 are replaced by separately controllable bidirectional bus drivers for the data and clock signal lines, respectively; Referring to the left hand connection 5L, a bidirectional clock signal line bus driver 60L is coupled between clock signal line 7L of the daisy chain bus (of FIG. 1) and the receiver 20L and transmitter 50L. The clock signal line output terminal of the bidirectional clock signal line bus driver 60L is also coupled to a left hand clock signal line input terminal CL of an arbitration logic circuit 80. In a similar manner, a bidirectional data signal line bus driver 70L is also coupled between the data signal line 9L of the daisy chain bus and the receiver 20L and transmitter 50L. The data signal line output terminal of the bidirectional data signal line bus driver 60L is also coupled to a left hand data signal line input terminal DL of an arbitration logic circuit 80. The right hand connection is arranged in a similar manner. A control logic circuit 90' has respective output terminals coupled to corresponding input terminals of the left hand and right hand clock bidirectional clock signal line bus drivers 60L and 60R; and the left hand and right hand bidirectional data signal line bus drivers 70L and 70R.

For normal data transfer operations, the left hand clock and data signal line bidirectional bus drivers, 60L and 70L, receive respective control signals from the control logic 90' which configure them to transfer clock and data signals, respectively, in the same direction. I.e. either both are configured to operate as input terminals, or both are configured to operate as input terminals. The right hand clock and data signal line bidirectional bus drivers, 60R and 70R, are sinmilarly configured in response to respective control signals from the control logic circuit 90'. In addition, the respective clock and data signal line bidirectional bus drivers, 60 and 70 L and R, respectively, are coupled to the appropriate one of the transmitters 50 L and R, and receivers 20 L and R, in the manner described above with reference to FIG. 1 and FIG. 2. However, during arbitration operations, the bidirectional clock signal bus driver 60 is controlled separately from the bidirectional data signal bus driver 70, in response to respective signals from the control logic 90'. These operations are better understood by referring to FIG. 4, FIG. 5, FIG. 6 and FIG. 7.

Figure 4:
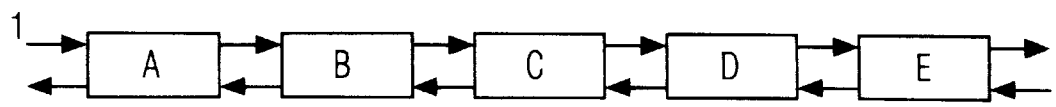
FIG. 4 is an illustration of a network of nodes arranged according to principles of the present invention while conflicting nodes are arbitrating for the use of the bus.

FIG. 4, FIG. 5, FIG. 6 and FIG. 7 are illustrations of a network of nodes according to the present invention, and illustrated in FIG. 3, arranged on a daisy chain bus, and operating in respectively different modes. The network illustrated in these figures is similar to that illustrated in FIG. 1. In FIG. 4, the bus is in an arbitration mode. Various approaches to initiating arbitration are known. For example, an arbitration time interval can be required prior to the start of every data transfer on the daisy chain bus, i.e., whenever any of nodes A, B, C, D and E, in FIG. 4 requires access to the bus. Another approach is to designate a node to be a bus master which controls the initiation of an arbitration time interval. One criterion which may be used to decide when to initiate an arbitration is when the chain bus has been quiescent for a predetermined amount of time. For the purposes of the present invention, it is assumed that before an arbitration according to the present invention occurs, it is initiated using any one of the known techniques.

According to the present invention, each node is preassigned a unique priority number consisting of a predetermined number of bits. When two or more nodes contend for use of the daisy chain bus, the priority numbers for those nodes are compared, in a manner to be described below, and the node with the highest priority, as represented by it's priority number, is granted use of the daisy chain bus.

Referring to FIG. 4, the clock signal line and data signal lines of the daisy chain bus are used for arbitration, and do not carry data or clock signals for transfer of information. The bidirectional clock signal bus drivers 60 in all of the nodes are configured for transferring data in opposite directions from the bidirectional data signal bus drivers 70 in response to respective control signals from the control logic 90'. For example, as illustrated in FIG. 4, the clock signal line bus drivers are configured for transferring signals from the left side of the figure to the right, the data signal line bus drivers are configured for transferring data from the right side to the left, and the inputs at the end nodes are coupled to a source of a logic '1' signal. In this illustrated embodiment, a logic '0' signal indicates a superior state and a logic '1' indicates an inferior state.

An arbitration time interval includes a predetermined number of time steps, equal to the number of bits in the priority number assigned to each node. At each time step in the arbitration time interval, one of the bits of the priority number in each node is tested in a manner to be described in detail below. In the illustrated embodiment, the bit in the priority number tested in all of the nodes during the first time step of the arbitration time interval is the most significant bit, the bit tested in the second time step is the second most significant bit, and so forth. One skilled in the art will understand, however, that the order in which the bits are tested is not important so long as the corresponding bit is tested in all the nodes, and all of the bits in the priority numbers are tested at some time during the arbitration time interval. At the end of the arbitration time interval, the contending node with the highest priority, as represented by its priority number, will be granted use of the bus.

Referring to FIG. 4, during the arbitration time interval, the signal on the clock signal line in the daisy chain bus passes from the left hand side to the right hand side, and the clock signal line input to the left most node A is tied to a source of an inferior state (logic '1') signal. In each of the nodes, A, B, C, D, and E, the left hand dock signal line bus driver 60L is configured by the control logic circuit 90' to receive a signal from the daisy chain bus which is supplied to the arbitration logic 80. The arbitration logic 80 generates a signal for the right hand clock signal line bus driver 60R in a manner to be described below. The right hand clock signal line bus driver 60R is configured by the control logic circuit 90' to transmit this signal to the daisy chain bus.

In a similar manner, the signal on the data signal line in the daisy chain bus passes from the right hand side to the left hand side, and the data signal line input to the right most node E is tied to a source of an inferior state (logic '1') signal. In each of the nodes A, B, C, D, and E, the right hand data signal line bus driver 70R is configured by the control logic circuit 90' to receive a signal from the daisy chain bus which is supplied to the arbitration logic 80. The arbitration logic 80 generates a signal for the left hand data signal line bus driver 70L in a manner to be described below. The left hand data signal line bus driver 70L is configured by the control logic circuit 90' to transmit this signal to the daisy chain bus.

If a node is not contending for access to the daisy chain bus, then it remains passive. The signal CL from the left hand clock signal line bus driver 60L is passed by the arbitration logic 80 unchanged to the right hand clock signal line bus driver 60R, and the signal DR from the right hand data signal line bus driver 70R is passed unchanged by the arbitration logic 80 to the left hand data signal line bus driver 70L.

For each time step in the arbitration time interval, each node which is contending for access to the daisy chain bus, processes the signals received from the daisy chain bus and a selected bit in the priority number, as described above. For example, for the first time step in the arbitration time interval, the first bit of the priority number in each node (the most significant bit in the illustrated embodiment) is processed in the respective arbitration logic circuits 80 in each of the nodes contending for access to the daisy chain bus. If this bit is a superior state (logic '0') signal, the arbitration logic 80 provides a superior state (logic '0') signal CR to the right hand side clock signal line bus driver 60R, and a superior state (logic '0') signal DL to the left hand side data signal line bus driver 70L.

If this bit is an inferior state (logic '1') signal, the arbitration logic 80 analyzes the clock signal line signal CL from the left hand connection, and the data signal line signal DR from the right hand connection. If either one of these signals is a superior state (logic '0') signal, then this node has lost the arbitration, and ceases to arbitrate for the remainder of the arbitration time interval. This node then becomes passive, and passes signals received at its daisy chain bus input terminals to the corresponding daisy chain bus output terminals unchanged, as described above with respect to nodes which are not arbitrating for access to the daisy chain bus. If both of the signals at the daisy chain bus input terminals are inferior state (logic '1') signals, then this node is still in contention for access to the daisy chain bus. In this case, the arbitration logic 80 provides an inferior state (logic '1') signal CR to the right hand side clock signal line bus driver 60R, and an inferior state (logic '1') signal DL to the left hand side data signal line bus driver 70L.

At the next time step, the next bit of the priority numbers of each of the nodes still contending for access to the daisy chain bus are processed in the same manner described above. For example, during the time step after the first time step of the arbitration time interval during which the most significant bit of the priority number is considered, the second most significant bit is processed. This continues until all the time steps have occurred, all bits in the priority numbers have been processed, and the arbitration time interval ends.

Figure 5:
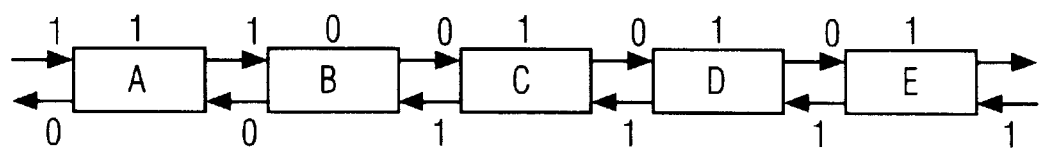
FIG. 5 is an illustration of the network of nodes illustrated in after the arbitration is completed.

After completion of the arbitration time interval, only one of the nodes remains active, termed the winning node below, and that node is granted daisy chain bus access. FIG. 5 is an illustration of the network of nodes illustrated in FIG. 4 after the arbitration is completed. In FIG. 5, node B is the winning node of an arbitration time interval. It is transmitting superior state (logic '0') signals from both of its daisy chain output terminals. All other nodes are in the passive mode. Because the ends of the bus are coupled to sources of an inferior state (logic '1') signal, each of the nodes between the winning node B and the end of the bus sees a superior state (logic '0') signal on the daisy chain bus input terminal on the side of the winning node B, and an inferior state (logic '1') signal on the other daisy chain bus input terninal. Each node now knows the relative location of the winning node, that is, the winning node is on the side which is receiving a superior state (logic '0') signal.

Figure 6:
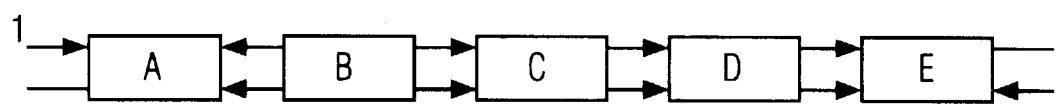
FIG. 6 is an illustration of the network of nodes illustrated in while data is being transmitted from the selected source node to the destination node.

Because each node knows the relative location of the winning node after arbitration, the logic circuit 90' can configure the bidirectional bus drivers, 60 L and R, and 70 L and R, to transfer the data from the winning node without further processing being necessary. FIG. 6 is an illustration of the network of nodes illustrated in FIG. 4 while data is being transmitted from the selected source node (node B) to the destination node (node D). As can be seen in FIG. 6, all nodes have configured their bidirectional bus drivers 60 L and R and 70 L and R to transfer data away from the winning node B. The winning node B transmits its data in both directions simultaneously on the daisy chain bus without regard for the relative location of the desired destination node. In this manner, node B may transfer data to node D, as in FIG. 1.

Figure 7:
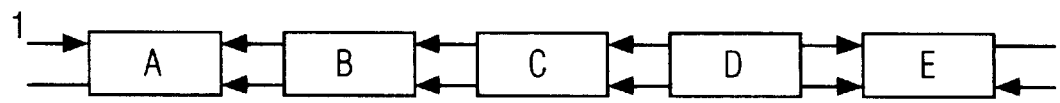
FIG. 7 is an illustration of the network of nodes illustrated in FIG. 4 in which a reply is sent from the destination node to the previously selected source node.

If an immediate response is required from node D to node B, all nodes reverse the direction of their bidirectional bus drivers 60 L and R and 70 L and R, and Node B is configured to receive data from the daisy chain bus. Node D now transmits data in both directions on the bus as shown in FIG. 7, ensuring that node B receives it.

In the embodiment illustrated and described, an in-line daisy chain bus system is described. One skilled in the art will understand that a similar arbitration scheme may be equally applicable to a daisy chain ring bus, provided one of the nodes on the ring is designated as the master node. The master node defines the end points of the bus during the arbitration time interval. In addition, in the illustrated embodiment, a superior state signal has been defined as a logic '0' signal and an inferior state signal has been defined as a logic '1' signal. One skilled in the art will also understand that a superior state signal may instead be defined as a logic '1' signal and an inferior state signal may be defined as a logic '0' signal.

I claim:

1. In a data bus system, including a plurality of nodes coupled together by a daisy chain bus, each node comprising:

a first bus connection comprising a first and a second bidirectional terminal;

a second bus connection comprising a first and a second bidirectional terminal; and arbitration logic coupled between said first and second bus connection; wherein said plurality of nodes operate in an arbitration mode, during an arbitration time interval, in which said first bidirectional terminal in said first bus connection of each node and said second bidirectional terminal in said second bus connection of each node are configured as input terminals, and said second bidirectional terminal in said first bus connection of each node and said first bidirectional terminal in said second bus connection of each node are configured to be output terminals; and a bus access mode in which said first and second bidirectional terminals in said first bus connection are configured to be one of input and output terminals and said first and second bidirectional terminals in said second bus connection are configured to be one of output and input terminals.

2. The system of claim 1 wherein the arbitration logic further comprises:

a memory for storing a priority number having a predetermined number of bits;

means for placing the node in the arbitration mode;

means for placing the node in an active state;

means for performing the predetermined number of time steps during the arbitration time interval, and for each step:

selecting a respective one of the bits in the priority number;

if the selected bit has a superior state, conditioning the output terminals of the first and second bus connections to produce superior state signals;

if the selected bit has an inferior state, and signals at the input terminals of both the first and second bus connections are inferior state signals, then conditioning the output terminals of the first and second bus connections to produce inferior state signals; and otherwise, for the remainder of the arbitration time interval, placing the node in a passive state in which signals at the input terminal of the first bus connection are supplied unchanged to the output terminal of the second bus connection, and signals at the input terminal of the second bus connection are supplied unchanged to the output terminal of the first bus connection; and means for placing the node in the bus access mode after the arbitration time interval, and if the node is in the active state, conditioning both the first and second bidirectional terminals of both the first and second bus connections to be output terminals.

3. The system of claim 2 wherein the means for placing the node in the active state further comprises:

means for deterninng if the node desires access to the daisy chain bus; and means for placing the node in the active state if the node desires access to the daisy chain bus, and placing the node in the passive state for the arbitration time interval otherwise.

4. The system of claim 2 wherein the means for placing the node in the bus access mode further comprises means for, if the node is in the passive state, conditioning the first and second bidirectional terminals of the bus connection receiving a superior signal to be input terminals, and the first and second bidirectional terminals of the bus connection receiving an inferior signal to be output terminals.

5. A method of arbitration in a data bus system, comprising a plurality of nodes, coupled together by a daisy chain bus, each node having a preassigned priority number having a predetermined number of bits, each of the plurality of nodes comprising a first bus connection having an input and an output terminal; and a second bus having an input and an output terminal, said method for each node to arbitrate for access to the daisy chain bus, comprising the steps of:

placing the nodes in an active state;

performing a predetermined number of time steps in an arbitration time interval, and for each step;

selecting a respective bit of the priority number of each node;

if the selected bit of each respective node has a superior state, then producing superior state signals at the output terminals of the first and second bus connections of the node;

if the selected bit of the node has an inferior state, and the signals at the input terminals of both the first and second bus connections of the node have inferior states, then producing inferior state signals at the output terminals of the first and second bus connections of the node; and otherwise, placing the node in a passive state for the remainder of the arbitration time interval, in which signals from the input terminal of the first bus connection of the node are supplied unchanged to the output terminal of the second bus connection of the node, and signals from the input terminal of the second bus connection of the node are supplied to the output terminal of the first bus connection of the node; and if, after the predetermined number of time steps, the node is in the active state, accessing the daisy chain bus.

6. The method of claim 5, in which the first and second bus connections in the data bus system each comprise first and second bidirectional terminals, further comprising the steps of:

conditioning the first bidirectional terminal in the first bus connection and the second bidirectional terminal in the second bus connection to be the input terminals, and conditioning the second bidirectional terminal in the first bus connection and the first bidirectional terminal in the second bus connection to be the output terminals; wherein the step of accessing the daisy chain bus comprises the steps of:

if the node is in the passive state, then conditioning the bidirectional terminals of the bus connection receiving a superior signal to both be input terminals, and conditioning the bidirectional terminals of the bus connection receiving an inferior signal to both be output terminals; and if the node is in the active state, then conditioning both the first and second bidirectional terminals of both the first and second bus connections to be output terminals.

7. The method of claim 6 wherein the step of accessing the daisy chain bus further comprises the step of: if the node is in the active state and after the conditioning step, sending data to a destination node.

8. The method of claim 7 wherein the step of accessing the daisy chain bus further comprises, after the step of sending data to a destination node, the steps of:

conditioning both the first and second bidirectional terminals of the both the first and second bus connection to be input terminals; and receiving reply data from the destination node.

9. The method of claim 5 wherein the step of placing the node in an active state comprises the steps of:

determining if the node desires access to the daisy chain bus; and if the node desires access to the daisy chain bus, placing the node in the active state, otherwise placing the node in the passive state for the arbitration time interval.

* * * * *